United States Patent Office 3,323,946
Patented June 6, 1967

3,323,946
METHOD OF PREPARING A COATING
COMPOSITION
Abraham Ravve, Chicago, and Joseph T. Khamis, Brookfield, Ill., assignors to Continental Can Company, Inc., New York, N.Y., a corporation of New York
No Drawing. Filed Feb. 24, 1965, Ser. No. 435,090
29 Claims. (Cl. 117—161)

This application is a continuation-in-part of applicants' copending application Ser. No. 372,352, filed on June 3, 1964, which, in turn, is a continuation-in-part of U.S. applications Ser. No. 100,499, filed Apr. 4, 1961, and Ser. No. 162,738, filed on Dec. 28, 1961, the latter two now abandoned.

This invention is directed to the method of preparing coating compositions and more specifically to the method of preparing coating compositions on various substrates, such as metal. Still more specifically, this invention is directed to the preparation of a thermosetting coating composition comprising a polymeric material cross-linked with a polycarboxylic acid. The polymeric material is prepared by copolymerizing at least one ethylenically unsaturated compound with at least one unsaturated ester and a glycidyl compound of an acrylic acid. The coating composition and its method of preparation is particularly characterized as comprising a solution of the polymeric material in an inert organic solvent which contains a dispersion of a polycarboxylic cross-linking agent which is substantially non-reactive and insoluble at room temperatures.

This invention is still more particularly directed to a method of preparing a coating for a metal substrate which comprises the solubilizing of effective amounts of a polymeric material in an inert organic solvent and dispersing therein a stoichiometric amount of a polycarboxylic acid cross-linking agent, the cross-linking agent being substantially insoluble in the organic solvent and non-reactive as a cross-linking agent at temperatures below approximately 115° F. The insoluble acids, together with a pigment, are dispersed in the solution of the polymeric material and have particle sizes of less than 15 microns. The dispersion of the solids in the solution of the polymeric material may be obtained by ball-milling the solid particles in the polymeric solution until the desired particle sizes are obtained.

The dispersion is subsequently coated onto the substrate and baked at temperatures ranging from about 150° F. to 700° F. for periods of time ranging from about 2 seconds to 30 minutes so as to obtain a thermosetting adherent coating.

In preparing coating compositions to be employed, for example, in coating metal surfaces, the behavior of the coating during fabrication of the metal is highly important. Thus, for example, the coating must adhere to the metal surface, even under the most stringent conditions and must be able to withstand various metal-forming operations. In addition, the coating must be able to resist attack by various chemicals and materials which will normally come into contact therewith and must be substantially inert, particularly when used as metal food containers, and not be subject to deterioration after being in contact with the various acidic foot items.

Heretofore, various polymeric materials having epoxy group-containing side branches pendant to the main backbone have been employed as coating compositions. These polymeric materials prepared from various copolymerizable monomers are known to cross-link with so-called epoxy-reactive substances which include, for example, the various polyfunctional primary and secondary amines, dibasic acids and their anhydrides, polyhydroxy compounds in acid mediums, cyclic aliphatic amines, tertiary amines and various aromatic amines. These cross-linking agents vary with respect to their reactivity to the pendant epoxy groups but all are sufficiently reactive to react with the epoxy groups at room temperature so as to form gels or cross-link at a substantially rapid rate. Consequently, it is obvious that because of the reactivity at room temperatures, it is necessary to avoid mixing the cross-linking agent with the epoxy materials until such time that the coating composition is ready to be used. It is apparent that the cross-linking agents and coating compositions used heretofore have a very short pot life in that cross-linking or a gel forms at room temperatures. To avoid this, it has been necessary to package the materials in separate containers and mix them just prior to their being used as coating material. This, of course, involves separate packages and increases the cost and problems involved in shipping.

One of the commercial limitations to the use of thermoset coatings, which depend upon epoxy group reactions to attain the thermosetting state, has been the poor weathering characteristics of the coatings. Thus, while these known epoxy coatings may be pigmented and used for some purposes, they do not, however, exhibit good weathering characteristics. Therefore, while they can be used primarily as undercoatings on vehicle bodies and the like, they are not completely satisfactory as surface finishes. In comparison, the epoxy-containing acrylic coatings of this invention have demonstrated to be highly effective against severe weather conditions. Thus, for example, while most of the known epoxy coating compositions decompose upon being subjected to ultraviolet radiation, the epoxy-containing acrylic coatings of this invention have not presented this problem.

In addition, in many of the commercially known epoxy polymeric coating compositions, the cross-linking agents most frequently used are unsatisfactory in that they are incompatible or are reactive with the various other components of the composition at room temperatures. These cross-linking agents are considered to be incompatible only insofar as they are highly reactive with other components of the coating composition at room temperature, since they are substantially soluble in the organic solvent at these temperatures. It is obvious, therefore, that the addition of an acidic cross-linking agent to a thermosetting coating composition, which contains an alkaline pigment, will cause a reaction at room temperature. Any degree of reaction between the cross-linking agent and the pigment or any other component of the composition, at these temperatures, will obviously limit the degree of cross-linking of the terpolymer at the higher baking temperatures. Generally, any reaction of the cross-linking agent with the pigments prior to curing results in a coating which has thixotropic and chalky characteristics. These conditions prevent most of the previously known compositions from being used as colored coatings. This is a serious drawback in that many commercial applications require colorful surfaces together with the desirable service properties. In order to obtain satisfactory colorful coatings, it is not only necessary that the surface have a high glossy appearance, but also that the coatings have good adhesion to the surface and have good flexibility. These characteristics are particularly important when the coating compositions are to be used for such applications as food containers, household articles, appliances, vehicle body panels, and various other outdoor fixtures. Thus, it has been found for the reasons mentioned that many of the known thermosetting compositions, particularly those used as exterior coatings, have not been completely satisfactory when employed in combination with pigments and/or fillers. Even in those instances where the pigment was found to be substantially or at least partially compatible or non-reactive with the compositions at room temperatures, most of the coatings were found not to have a high glossy appearance after the final curing.

Accordingly, it is an object of this invention to provide a method of preparing a coating composition which can be baked on various surfaces, particularly metal, at temperatures as high as 700° F. and more preferably at temperatures of about 550° F.

It is another object of this invention to provide a method of preparing a coating composition on a metal substrate which exhibits a high gloss surface and may contain various colored pigments. These coatings are prepared on the substrate by utilizing an organic solution of a thermosetting polymeric material which contains an effective amount of a cross-linking agent which is substantially insoluble in the solvent at room temperature.

Still a further object of this invention is to provide a method of preparing a coating composition which comprises a polymeric material solubilized in an inert-organic solvent which contains a dispersion of a cross-linking agent which is non-reactive and substantially insoluble in the solvent at temperatures below 115° F. The non-reactivity of the cross-linking agent at these temperatures enables the preparation of a coating composition which has a long pot life at room temperatures.

It is still a further object of this invention to provide a method of preparing a high gloss coating on a metal substrate by utilizing a thermosetting polymeric material solubilized in an organic solvent which contains dispersed therein an effective amount of a cross-linking agent which is insoluble in the solvent and has a particle size of less than 15 microns.

It is still a further object of this invention to provide a metal substrate containing a high gloss coating which comprises a pigment. The coating is prepared by ball-milling an insoluble dispersion of the cross-linking agent and the pigment in an organic solution of a thermosetting polymeric material. The dispersions of the insoluble components are obtained by ball-milling the solids, in situ, with the polymeric material until the particle sizes of the solids are less than 15 microns.

It is still another further object of this invention to provide a method of preparing a coating on a metal substrate by utilizing a composition which has a long pot life at room temperatures and comprises an organic solution of a polymeric material containing a dispersion of an insoluble cross-linking agent. The dispersion in the organic solution is obtained by ball-milling the cross-linking agent, together with the pigment if desired, so as to obtain particle sizes of less than 15 microns. The purpose of dispersing the cross-linking agent in the solution of the polymeric material is to prevent any reaction or curing at room temperature. Thus, the coating has a long pot life and can be utilized after long periods of storage as a coating to form high gloss surfaces after being cured at temperatures above 150° F.

These and other objects of the invention will be obvious from a further and more detailed description to follow.

Accordingly, it has been discovered, quite unexpectedly, that coating compositions having a long pot life can be prepared on metal substrates by solubilizing a polymeric material in an inert-organic solvent so as to obtain a solution. A curing agent, such as polycarboxylic acid, is dispersed in the solution of the polymeric material and is particularly characterized as having a particle size of less than 15 microns and more preferably less than 12 microns.

The dispersion of the cross-linking agent in the solution may be obtained by ball-milling the acid in situ or it can be prepared by separately ball-milling the acid together with the pigment, if desired, and then dispersed with the solution of the polymeric material. It is essential that the particle size of the insoluble components be less than 15 microns or, in other words, have a grind gage better than 5 and more preferably better than 7, as determined in the Hegman gage. Unless the particle sizes of the solids dispersed in the organic medium are less than 15 microns, it may be possible to obtain a finished surface which has a relatively high gloss but will have also a pebbly appearance which makes it completely unsatisfactory.

The dispersion of the cross-linking agent and pigment, together with the polymeric material, is coated onto the substrate and baked at temperatures ranging from about 150° to 700° F. and more preferably at temperatures ranging from about 180° to 550° F. for periods ranging from about 2 seconds to 30 minutes. The length of time in baking the coating onto the substrate will depend upon the temperature utilized. Thus, for example, at temperatures as high as 700° F., it will be necessary only that the baking take place for approximately 2 or 3 seconds, whereas if the baking temperature is as low as 180° F., the baking may continue for periods of up to 20 minutes. The preferred baking temperatures, however, range between 180° and 550° F. for periods of time ranging from about 3 seconds to 20 minutes.

The solution of the polymeric material is obtained by solubilizing the termosetting copolymer in an inertorganic solvent. These thermosetting copolymers are obtained by polymerizing in the presence of an effective amount of a well-known catalyst approximately 50 to 85 parts by weight of at least one ethylenically unsaturated compound, 0 to 50 parts by weight of at least one unsaturated ester and 1 to 20 parts by weight of a glycidol compound of an acrylic acid.

More specifically, the polymeric material is obtained by copolymerizing 50 to 85 parts by weight of an ethylenically unsaturated compound selected from the group consisting of methyl methacrylate, ethyl methacrylate, propyl methacrylate, isopropyl methacrylate, butyl methacrylate, isobutyl methacrylate, vinylbenzene, and other hydrocarbon-substituted vinylbenzenes. This ethylenically unsaturated compound is copolymerized with about 0 to 50 parts by weight of the unsaturated ester which is selected from the group consisting of a vinyl ester of a saturated monocarboxylic acid, an ester of acrylic acid, wherein the saturated group of the ester may contain 2 to 18 carbon atoms per molecule and an ester of an unsaturated dicarboxylic acid.

Any one of the unsaturated esters, if desired, may be copolymerized with the ethylenically unsaturated compounds, together with about 1 to 20 parts by weight of a glycidyl compound of an acrylic acid, such as glycidyl ester of acrylic acid. It is possible in preparing the polymeric material to use one or more of the ethylenically unsaturated compounds, such as a combination of methyl methacrylate with butyl methacrylate, together with one or more of the unsaturated esters, such as the vinyl ester and/or the esters of acrylic acid. This copolymerized polymeric material is then solubilized in the inert-organic solvent in an amount ranging from about 5 to 95% by weight and more preferably in amounts ranging from about 20 to 80% by weight. The cross-linking agent includes those polycarboxylic acids which are effective for curing the polymeric material at higher temperatures ranging from about 150° to 700° F. but it is essential that the cross-linking agent be insoluble in the organic solvent at temperatures below 115° F. or at about room temperatures, e.g., 50 to 98° F. The acid cross-linking agents are dispersed in the organic solvent in a stoichiometric amount or that amount sufficient to react as a cross-linker with the polymeric material.

Normally, an amount ranging from about 1 to 10% by weight of the polymeric material and more preferably an amount ranging from about 1 to 5% of the polymeric material may be used. In addition to utilizing a cross-linking agent, i.e., polycarboxylic acid, which is insoluble in the organic solvent, it is essential that the particle size of the solid which is dispersed in the organic solvent be less than 15 microns and more preferably less than 12 microns. Likewise, if it is desirable, the pigment, such as titanium dioxide, should be dispersed in the organic solvent in an amount ranging from 0 to 90% by weight of the composition and also have a particle size less than 15 microns.

There are a number of polycarboxylic acids or compounds thereof which may be used satisfactorily as crosslinking agents for purposes of this invention. It has been found, however, that the preferred polycarboxylic acids include such compounds as citric acid, aconitic acid, tartaric acid, chlorendic acid, citraconic acid, mesaconic acid, itaconic acid, maleic acid, fumaric acid, and oxalic acid. In addition, other acids which may be used include phthalic acid, mellitic acid, pyromellitic acid, trimellitic acid, iso- and hydro-phthalic acids, adipic, sebasic, azelaic, polyacrylic and polymethacrylic acids, and the dimer acids, such as the dimerized unsaturated fatty acids and some of the acidic compounds, such as the citric acid acetate.

The ethylenically unsaturated component used in preparing the interpolymer may include one or more of the alkyl methacrylates, vinylbenzene and the hydrocarbon substituted vinylbenzenes. These compounds may be characterized by the structural formula:

(1) 

wherein Y is a phenyl, tolyl or ester group having an alkyl substituent of 1 to 4 carbon atoms and R is a hydrogen radical when Y is a phenyl or tolyl and is a methyl radical when Y is an ester radical. Of the many compounds coming within the general formula, the alkyl methacrylates, e.g., methyl methacrylate, and the vinylbenzene monomers are preferred. These monomers may be used either alone or in combination in preparing the interpolymer. On examination, baked coatings obtained by using either the methyl methacrylate or the vinylbenzenes provided a coating which exhibited characteristics quite similar with respect to flexibility, metal adhesion and pot life.

The unsaturated ester may be present in the copolymer in an amount ranging from 0 to 50 parts by weight and includes monomers which must have at least on ethylenic bond in the molecule so as to copolymerize with the ethylenically unsaturated monomers. The unsaturated portion of the ester may either be in the alcohol radical or in the acid radical. Thus, the unsaturated esters may be either vinyl esters of saturated monocarboxylic acids, esters of acrylic acid wherein the saturated group contains 2 to 18 carbon atoms per molecule or esters of an unsaturated dicarboxylic acid. The length of the saturated portion of the acrylic acid ester functions as an internal plasticizer for the thermosetting polymer.

The unsaturated esters of acrylic acid may include, for example, butyl acrylate, isobutyl acrylate, ethyl hexyl acrylate, octyl acrylate, decyl acrylate, as well as the higher alkyl homologues such as stearyl acrylate. The diester monomers include dioctyl maleate and dioctyl fumarate. In addition, other dialkyl maleates and fumarates may be employed and include compounds wherein the alkyl group ranges from 2 to 12 carbon atoms.

The vinyl esters which may be used as the unsaturated ester include vinyl acetate, vinyl propionate, vinyl n-butyrate, vinyl isobutyrate, vinyl n-valerate, vinyl isovalerate, methyl vinyl caproate, vinyl heptoate, and other higher alkyl homologues such as vinyl stearate. The acid radical of these unsaturated esters generally corresponds to the longer saturated alkyl groups of the above-mentioned acrylates.

Of the above-mentioned acrylate esters, ethyl hexyl acrylate is preferred in that the branched 8-carbon atom alkyl group provides a particularly effective internal plasticizing effect for the interpolymer when cross-linked. This particular ester, as well as the other acrylates, enter into the polymeric structure through the double bond and provides branched groups on the polymeric chain in addition to the side group as illustrated in Formula 1, above. The effect is to impart internal plasticizing branches on the backbone of the interpolymer's molecular chain with the amount employed controlling the flexibility which will be obtained in the final cross-linked product. Accordingly, the 8-carbon atom chain of the ethyl hexyl acrylate has been found to be more effective per unit weight, than the 2-carbon atoms of ethyl or the 4-carbon atoms of butyl esters. Generally, however, it is only necessary that the branch groups contain from about 2 to 18 carbon atoms per molecule. These branch groups are, of course, the saturated portions of the unsaturated esters with the unsaturated portion of the ester being a part of the copolymerized backbone chain of the interpolymer.

The third monomeric component used in preparing the interpolymer is a glycidyl compound of an acrylic acid, such as a glycidyl ester of methacrylic acid. This monomer is a bifunctional epoxy compound of an unsaturated acid and includes both the glycidyl esters of methacrylic and acrylic acids.

As an alternative, it is also possible to utilize allyl glycidyl ethers and glycidyl crotonates to form interpolymers having lower molecular weights which, in turn, confers a greater degree of flexibility upon the final product. In some instances it has been found desirable to use one or more of the epoxy-containing esters in preparing the backbone chain of the interpolymer. The glycidyl ester enters into the interpolymer chain by copolymerization through the double bond unsaturated link of the acid portion of the molecule, thus leaving the epoxy group as a pendant group to the main polymeric chain.

It is essential that the glycidyl compounds contain an epirane or oxirane group in one portion of the monomer and an ethylenically unsaturated bond in another portion. These two reactive sites of the glycidyl compounds being partially isolated from one another's electrical effects by an intervening oxygen atom or acyl group. These compounds can be characterized by the formulas as follows:

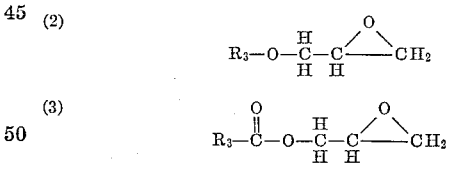

wherein $R_3$ is an alkenyl group having a single ethylenically unsaturated bond wherein the glycidyl compounds of the Formulas 3 and 4 may enter into the backbone structure of the interpolymer. While the above monomers enumerated show only $R_3$ as having 2 or 3 carbon atoms, it is possible to use monomers wherein $R_3$ contains up to 5 carbon atoms.

The interpolymer used as the polymeric material for purposes of this invention is prepared by copolymerizing one or more of the above-mentioned monomers in a volatile inert organic solvent, such as methyl ethyl ketone or xylene, in the presence of a catalyst, such as the organic peroxides. The monomers are copolymerized by refluxing same at a temperature of approximately 80° C. for periods of 6 to 8 hours under an inert atmosphere, such as nitrogen. The resulting product or interpolymer is precipitated by the addition of a non-solvent, such as an alcohol.

Various peroxide catalysts may be employed for the copolymerization and include such compounds as benzoyl peroxide and other per compounds which are known to effect polymerization of ethylenically unsaturated monomers. These organic peroxides include dicumene peroxide, cumene hydroperoxide, tertiary butyl peroxide, tertiary butyl perbenzoate, methyl ethyl ketone peroxide, and other compounds such as azobisisobutyronitrile.

The cross-linking agents applicable for purposes of this invention are highly reactive with the above-described interpolymers at elevated temperatures, but on the other hand are completely non-reactive because of their insolubility at temperatures below 115° F., or at around room temperature. The general characteristics of some of the preferred cross-linking agents include those acids which contain either two carboxyl groups, together with the presence of hydroxyl groups, or three or more carboxyl groups or groups which are equivalent to carboxyl groups. Thus, for example, tartaric acid contains 2 carboxyl and 2 hydroxyl groups in its meso form, as well as in its racemic form, whereas citric acid contains 3 carboxyl groups with a single hydroxyl group.

Since there is no free radical catalyst present when the cross-linking agent is added to the interpolymer, the ethylenically unsaturation of the cross-linking agent does not affect the final properties of the polymer if it is present in the structure in small amounts.

The amount of the polycarboxylic cross-linking agent in the final product may range from about 1 to 15 parts by weight and is, therefore, added to the coating composition in a stoichiometric amount. In other words, a sufficient amount of the cross-linking agent is added to the coating composition so as to cross-link the epirane oxygen groups of the interpolymer. Thus, it is only necessary to add that amount of cross-linking agent required to sufficiently cure or cause the interpolymer to become thermosetting.

The following examples illustrate a method of preparing coating compositions in accordance with this invention.

*Example I*

| Components: | Parts by wt. |
|---|---|
| Vinylbenzene | 65 |
| Ethyl hexyl acrylate | 20 |
| Glycidyl methacrylate | 11 |
| Methyl ethyl ketone | 250 |
| Benzoyl peroxide | 1 |

The vinylbenezene and ethyl hexyl acrylate were added to the methyl ethyl ketone and thereafter mixed with the glycidyl methacrylate and benzoyl peroxide. The mixture was stirred and refluxed at a temperature of 80° C. for about 6 to 8 hours under an inert atmosphere of nitrogen. Following this reaction, a product was recovered by precipitating with ethanol followed by a washing with alcohol. The product was solubilized in xylene and 5 parts by weight of citric acid were added to the solution. This mixture was milled until the particle size of the solid components were less than 15 microns. The milled product was coated onto a metal substrate and baked at elevated temperatures for a time sufficient to cause the cross-linking. The baking temperature took place at a temperature of 375° to 450° F. with an inverse time function of 8 to 12 minutes. Other coated specimens were cured at a temperature ranging up to about 700° F. for only a few seconds. At temperatures below approximately 550° F. prolongation of the baking periods did not appear to cause the coating to deteriorate.

The thermosetting resin coating on the metal substrate exhibited essentially good flexibility and did not crack or peel upon being used to fabricate metal containers. The coating exhibited a low extractability with common organic solvents and had a smooth clear finish. A portion of the thermosetting composition was milled with an effective amount of an agglomerate of a titanium dioxide pigment until the particle size was reduced to less than 12 microns. The pigmented coating was then applied to a metal substrate and baked under the same conditions. Following the baking, the sample was cooled and found to have a glossy surface which was highly flexible and did not crack or peel from the underlying metal substrate upon being fabricated into metal containers. This thermosetting resinous composition had outstanding utility in that it may be employed as a coating which may contain pigmented enamel or dyes. The pigmented thermoset coatings showed approximately the same extractibility and flexibility, as well as good metal adhesion, as the clear coatings.

In addition, it was found that the thermosetting composition had an outstanding shelf life and pot life which enabled it to be used at later dates with complete satisfaction.

A preferred embodiment of this invention is to solubilize the polymeric material in the inert-organic solvent so as to obtain the desired viscosity and then subsequently add thereto the cross-linking agent. The particular cross-linking agents to be added to the solution must be insoluble in the organic solvent and can be added simultaneously with the pigment. Subsequently, the solid components are milled, in situ, with the solution of the polymeric material until the particle size of the solids are less than 12 microns. The cross-linking agents, such as citric, aconitic and tartaric, have very low solubilities in the polar solvents at room temperature and, therefore, require milling to obtain the desired particle size.

*Example II*

| Components: | Parts by wt. |
|---|---|
| Vinylbenzene | 130 |
| Ethyl hexyl acrylate | 40 |
| Glycidyl acrylate | 20 |
| Xylene solvent | 60 |
| Tertiary butyl peroxide | 3.8 |

A 500 milliliter flask was equipped with a stir, a reflux condenser, a gas inlet tube and a dropping funnel. About 60 grams of xylene were introduced and nitrogen was supplied to expel the oxygen. The xylene was then heated to a reflux temperature of about 140° C. A liquid mixture of about 130 grams of vinylbenzene, 40 grams of ethyl hexyl acrylate, 20 grams of glycidyl acrylate and 3.8 grams of tertiary butyl peroxide were then passed into the flask at refluxing temperatures slowly over a period of about one and one-half hours. Refluxing was continued for an additional one and one-half hours until the reaction was complete. The mixture was cooled and a high yield of about 190 grams of polymeric material were obtained.

The resinous or polymeric material was divided into two portions, one to be used as a clear varnish and the other as a pigmented coating. Thus, the two portions of the polymeric solution were divided into two samples, each containing about 95 grams of the resin (100% non-volatile matter) in about 30 grams of xylene. About 146.2 grams of a volatile hydrocarbon liquid which is a mixture of an aliphatic and aromatic solvent was added to the first portion of polymeric material, together with a dispersion of 4.95 grams of hydrous citric acid dispersed in 14.85 grams of hydrocarbon liquid.

The second sample was blended with about 95 grams of titanium oxide (rutile) 4.95 grams of hydrous citric acid and 68 grams of the aliphatic-aromatic solvent. The mixture was then milled on a three-roll mill until the pigment particles were less than 15 microns. Both of these coating compositions were then applied to a metal substrate and cured at temperatures in accordance with the process of Example I. The unpigmented coating was a translucent prior to curing and became substantially clear after it cured on the metal surface.

In lieu of the vinylbenezene of Examples I and II, it is possible to use vinyl toluene or methyl styrene as one of the comonomers. The thermosetting metal coating compositions prepared from compositions of Examples I and II were found to have a high resistance to solvents, tolerant to severe distortion by bending and non-contaminating to foodstuffs.

Example III

The interpolymer of Example II was prepared in the same manner and then divided into two separate portions. The first portion contained approximately 95 grams of the interpolymer (100% non-volatile matter) in about 30 grams of xylene. About 146.2 grams of a volatile hydrocarbon liquid was added to this portion and a coating compostion was prepared by adding to the organic solution 4.95 grams of tartaric acid dispersed in 16.9 grams of xylene. The second portion of the interpolymer was blended with 95 grams of titanium oxide (rutile), 4.95 grams of tartaric acid and 58 grams of an aliphatic-aromatic solvent. The mixture was then milled on a three-roll mill until the pigment and acid particles were less than 12 microns. Each of these thermosetting compositions were then coated onto a metal base and baked at a temperature ranging up to 500° F. until a cured coating was obtained. The coated specimens were tested and found to have properties similar to those described in Examples I and II.

Example IV
Components: Parts by wt.
 Methyl methacrylate _____ 70
 Ethyl hexyl acrylate _____ 20
 Glycidyl acrylate _____ 10
 Xylene solvent _____ 60
 Benzoyl peroxide _____ 1

The three monomers were copolymerized in the xylene solvent in the presence of the benzoyl peroxide in a manner set forth in Examples I and II. The interpoymer was then suspended in an inert-organic solvent and milled together with a cross-linking amount of citric acid and a pigment of titanium oxide. The amount of citric acid used was approximately 5 grams which is substantially the stoichiometric amount necessary to react with the epoxy oxygen groups of the interpolymer. The thermosetting composition was then used as a coating on a metal substrate and baked at a temperature ranging between 375–415° F. The cured specimens were subsequently tested and found to have satisfactory flexibility, metal adhesion and pot life.

Example V
Components: Parts by wt.
 Vinyl toluene _____ 34.2
 Methyl methacrylate _____ 34.2
 2-ethyl hexyl acrylate _____ 21.2
 Glycidyl acrylate _____ 10.0

Here, both the vinyl toluene and the methyl methacrylate were used as the ethylenically unsaturated monomer which were copolymerized with the glycidyl acrylate and 2-ethyl hexyl acrylate to form the interpolymer in the manner described for Example II. A solution of the polymeric material was milled in the presence of an effective amount of a citric acid as a cross-linking agent and titanium oxide as the pigment. The mixture was milled until the solids were dispersed in the organic solvent and had a particle size of less than 12 microns. The composition was subsequently used as a coating on a metal substrate and found to have good adhesion to metal surfaces, and a long shelf and pot life. It was found that a substitution of the vinyl toluene for a portion of the methyl methacrylate failed to make any change in the chemical or physical properties of the coating composition, except that the methyl methacrylate is a more expensive material and forms a harder film.

Example VI
Components: Parts by wt.
 Vinyl benzene _____ 40
 Methyl methacrylate _____ 40
 Stearyl methacrylate _____ 10
 Glycidyl acrylate _____ 10

The monomers were copolymerized in accordance with the procedure set forth in Example I and subsequently cross-linked in the presence of a titanium dioxide pigment with a stoichiometric amount of aconitic acid. The presence of the longer alkyl group in the interpolymer as a result of the copolymerization with styrol methacrylate into the backbone chain gave the product a slightly increased flexibility over the previous example, but in all other respects the coating was similar.

Example VII
Components: Parts by wt.
 Vinyl toluene _____ 57.2
 Methyl methacrylate _____ 28.6
 Glycidyl acrylate _____ 14.2

These monomers were copolymerized in the presence of the peroxide catalyst to obtain a polymerized product which was solubilized in an organic solvent in accordance with the procedure of Example I. The polymeric solution was mixed with a stoichiometric amount of citric acid and an effective amount of titanium dioxide and subsequently milled until the dispersed solids had a particle size of less than 12 microns. The coating was applied to a metal and baked at temperatures approaching 500° F. until a cured thermosetting film was obtained.

Example VIII
Components: Parts by wt.
 Vinyl benzene _____ 130
 Ethyl hexyl acrylate _____ 40
 Glycidyl acrylate _____ 20
 Xylene _____ 60
 Tertiary butyl peroxide _____ 3.8

The above monomers were copolymerized at reflux temperatures of about 140° C. until a thermosetting composition was obtained. Approximately 18.3 parts by weight of this resin, together with 55 parts by weight of a red-red toned molybdate pigment, dispersed in 26.7 parts by weight of xylene were ball-milled until the particle sizes of the solids were less than 12 microns. A stoichiometric amount of a chlorendic acid paste was added to the solution of resin containing the dispersed pigment and subsequently used as a coating on a metal substrate. The coating was sprayed on the panels which were then baked at temperatures ranging up to about 500° F. until a cured film was obtained. The chlorendic acid paste was prepared by ball-milling approximately 1200 grams of the chlorendic acid with about 240 grams of a 50% solution of the above-mentioned resin in 1000 grams of xylene.

Still other panels were coated with the thermosetting composition and baked at the temperatures shown below:

TABLE I

| Time (Minutes) | Temp., ° F. | Gloss-imeter Values | Solubilities | |
|---|---|---|---|---|
| | | | Xylene | Acetone |
| 20 | 180 | 100 | Good | Good |
| 30 | 225 | 97.9 | Good | Good |

Example IX
Components: Parts by wt.
 Vinyl toluene _____ 90
 2-ethyl hexyl acrylate _____ 90
 Glycidyl acrylate _____ 20
 Di-tertiary butyl peroxide _____ 8

These monomers were copolymerized at reflux temperatures of 140° C. under a nitrogen atmosphere for a period of about one and one-half hours. Approximately 125 grams of the copolymer as a 75% solution in an organic solvent, together with 174 grams of titanium dioxide and 21.9 grams of a dimer acid, were milled on a three-roll mill until the particle sizes of the solids were less than 12 microns. The mixture was then adjusted to 925 poise with the addition of a solvent. The coating composition was then rolled onto various metal panels and baked at temperatures ranging from 340–400° F. until a cross-linked coating was obtained.

*Example X*

| Components: | Parts by wt. |
|---|---|
| Xylene | 133 |
| Decyl acrylate (approx.) | 265 |
| Glycidyl acrylate | 133 |
| Styrene | 815 |
| Tertiary butyl perbenzoate | 24.26 |

The monomers were copolymerized in a three-liter flask equipped with a stirrer, reflux condenser and a gas-inlet tube. A dropping funnel was used to add approximately 1,237 grams of the reactant to the xylene. The xylene was heated to the reflux temperature and the monomeric mixture, together with the catalyst, was slowly added to the refluxing xylene over a period of about 2½ hours.

A white enamel coating composition was prepared from the resin material by ball-milling approximately 1,100 grams of the resin with 100 grams of titanium dioxide and 51.9 grams of citric acid. The composition was applied to a metal substrate and baked at a temperature ranging up to 500° F. for a period to obtain a good cross-linked coating.

Specimens of the above-mentioned coating compositions were deposited on metal substrates and subsequently exposed to an outdoor weathering test for a period of about one year. This weather test involved exposure of the panels to large volumes of sunlight, as well as to high humidity, for a long period of time. It was found, however, that the weather had no adverse effect on the gloss of the surface coatings. Thus, it was found that the glossimeter values before and after exposure to weather conditions were substantially the same. The glossimeter readings were obtained according to the ASTM procedure D523–53T at 20° angle of light.

In preparing the solutions of the polymeric materials, it is generally desirable to use low-polar solvents which may be characterized as being non-oxygen or halogen-containing organic solvents. These solvents are preferably the aromatic compounds which include, for example, benzene, toluene, xylene, ethyl benzene, cumene, naphthalene and its derivatives, such as tetrahydronaphthalene or tetralin and some of the aromatic solvents sold commercially by the trade names of Solvesso and Panasol. In addition to these solvents, mixtures may be used, such as, for example, mixtures prepared by using xylene, benzene or toluene with small amounts of about 1 to 10% by weight of other liquids, such as cyclohexanone, as well as the higher ketones and the various esters, such as dimethyl, phthalate, dibutyl sebacate, butyl acetate, etc. Other organic liquids which may be used in small amounts as a solvent include butyl Cellosolve acetate, methyl Cellosolve acetate and the like. The presence of small amounts of these more highly polar liquids has not been found to be detrimental to the coating compositions in that the cross-linking agents or polycarboxylic acids are still considered to be substantially insoluble in these liquids at temperatures at least below 115° F.

The importance of keeping the cross-linking agent insoluble in the organic solvent at storage or at least room temperatures is not only to prevent the reaction or cross-linking of the interpolymer, but also to prevent the acidic cross-linking agent from reacting with the various pigments when normally used in coating compositions. These pigments include, for example, basic compounds such as titanium dioxide, red-lead, zinc oxide and other metal oxides which would react with the polycarboxylic acid cross-linking agents at room temperature if in solution. Heretofore, the use of soluble cross-linging agents presented a problems in that it was difficult to obtain clear glossy pigmented surfaces because of the reaction of the cross-linking agent with the pigments and polymeric materials. Thus, not only is the insolubility of the cross-linking agent critical for commercial purposes, but also for purposes of obtaining high gloss coating surfaces.

TABLE II

| Coating Composition | Time Bake Temp., °C. | 20° Gloss |
|---|---|---|
| (1) Citric Acid (dispersed per Example I) | 10′ at 196° | 49<br>50.4<br>51.6 |
| (2) Citric Acid (in solution) | 10′ at 196° | 1.6<br>1.7<br>1.7 |
| (3) Citric Acid (dispersed per Example I) | 30′ at 126° | 84<br>83.6<br>83.5 |
| (4) Citric Acid (in solution) | 30′ at 126° | 1.0<br>1.0<br>1.0 |

The importance of utilizing a dispersion of the cross-linking agent, e.g., citric acid, as distinguished from the solution of the acid, is illustrated in the data of Table II. Here, coated panels 1 and 3 were prepared in accordance with the process set forth in Example I of this invention except that the temperatures were changed as indicated. Likewise, coated panels 2 and 4 were prepared in accordance with the procedure of Example I except for the change in baking temperatures and the fact that the citric acid cross-linking agent was in solution with the polymeric material as opposed to a solid dispersion.

Thus, it can be seen from the data that those panels prepared from a coating composition wherein the cross-linking agent was dispersed as solid particles having particle size less than 12 microns resulted in a coating which had a substantially higher gloss as determined by the glossimeter in comparison to those panels coated with the same composition except for the cross-linking agents being in solution.

While this invention has been described with a number of specific embodiments, it is obvious that there are other modifications and variations which can be resorted to except as more particularly pointed out in the appended claims.

We claim:

1. A method of preparing a thermosetting coating composition which is cured at temperatures above 150° F. and has a long pot life around room temperatures which comprises solubilizing an effective amount of a polymeric material in an organic solvent and dispersing therein 0 to 90% by weight of a pigment and a stoichiometric amount based on the epirane oxygen groups present in the glycidyl compound of a polycarboxylic acid cross-linking agent; said pigment and polycarboxylic acid being substantially insoluble in the organic solvent and non-reactive at temperatures below 115° F. and having particle sizes of less than 15 microns; said polymeric material consisting essentially of the polymerization product of about 50 to 85 parts by weight of at least one ethyleneically unsaturated compound selected from the group consisting of methyl methacrylate, ethyl methacrylate, propyl methacrylate, isopropyl methacrylate, butyl methacrylate isobutyl methacrylate, vinylbenzene and hydrocarbon-substituted vinylbenzenes; about 0 to 50 parts by weight of at least one unsaturated ester selected from the group consisting of a vinyl ester of a saturated monocarboxylic acid, an ester of acrylic acid wherein the saturated group contains 2 to 18 carbon atoms per molecule and an ester of an unsaturated dicarboxylic acid and about 1 to 20 parts by weight of a glycidyl compound of an acrylic acid.

2. The method of claim 1 further characterized in that the polymeric material ranges from about 5 to 95% by weight of the composition.

3. The method of claim 2 further characterized in that the polycarboxylic acid ranges from about 1 to 10% by weight of the polymeric material.

4. The method of claim 1 further characterized in that the inert-organic solvent is a substantially non-polar aromatic solvent.

5. The method of claim 1 further characterized in that the solid dispersion of the cross-linking agent and pigment have a particle size of less than 12 microns.

6. The method of claim 1 further characterized in that the polycarboxylic acid cross-linking agent is selected from the group consisting of citric acid, aconitic acid, tartaric acid, citraconic acid, itaconic acid, maleic acid, fumaric acid, oxalic acid, and chlorendic acid.

7. The method of claim 1 further characterized in that the polymeric material consists essentially the polymerization product of 50 to 85 parts by weight of vinylbenzene, 0 to 50 parts by weight of an ester of acrylic acid and 1 to 20 parts by weight of a glycidyl ester of an 8. The method of claim 1 further characterized in that the polymeric material consists essentially of the polymerization product of about 50 to 85 parts by weight of a lower alkyl methacrylate, 0 to 50 parts by weight of a vinyl ester of a saturated monocarboxylic acid and about 1 to 20 parts by weight of a glycidyl ester of an acrylic acid.

9. The method of claim 1 further characterized in that the polymeric material consists essentially of the polymerization product of about 50 to 85 parts by weight of a lower alkyl methacrylate, 0 to 50 parts by weight of an acrylic acid ester and 1 to 20 parts by weight of a glycidyl ester of an acrylic acid.

10. The method of claim 1 further characterized in that the pigment is titanium dioxide and the polycarboxylic acid cross-linking agent is citric acid.

11. The method of claim 1 further characterized in that the polycarboxylic acid cross-linking agent is tartaric acid.

12. The method of claim 1 further characterized in that the polycarboxylic acid cross-linking agent is chlorendic acid.

13. The method of claim 1 further characterized in that the dispersion of the pigment and the polycarboxylic acid cross-linking agent in the organic solution of the polymeric material is obtained by ball-milling the mixture until the particle sizes of the insoluble components are less than 15 microns.

14. A method of preparing a thermoset coating on a substrate which comprises solubilizing an effective amount of a polymeric material in an inert-organic solvent and dispersing therein a stoichiometric amount based on the epirane oxygen groups present in the glycidyl compound of a polycarboxylic acid cross-linking agent and 0 to 90 parts by weight of a pigment; said pigment and cross-linking agent being substantially insoluble and non-reactive in the organic solvent at temperatures below 115° F. and having a particle size of less than 15 microns; and subsequently coating said dispersion onto the substrate and baking the coated substrate at temperatures ranging from about 150° F. to 700° F. for a period ranging from about 2 seconds to 30 minutes; said polymeric material prepared by copolymerizing about 50 to 85 parts by weight of at least one ethylenically unsaturated compound selected from the group consisting of methylmethacrylate, ethyl methacrylate, propyl methacrylate, isopropyl methacrylate, butyl methacrylate, isobutyl methacrylate, vinylbenzene and hydrocarbon-substituted vinylbenzenes; about 0 to 50 parts by weight of at least one unsaturated ester selected from the group consisting of a vinyl ester of a saturated monocarboxylic acid, an ester of acrylic acid wherein the saturated group contains 2 to 18 carbon atoms per molecule and an ester of an unsaturated dicarboxylic acid and about 1 to 20 parts by weight of a glycidyl compound of an acrylic acid.

15. The method of claim 14 further characterized in that an effective amount of the polymeric material ranges from about 5 to 95% by weight of the coating composition.

16. The method of claim 14 further characterized in that the polycarboxylic acid cross-linking agent is dispersed in the organic solvent in an amount ranging from about 1 to 10% by weight of the polymeric material.

17. The method of claim 14 further characterized in that the inert-organic solvent comprises a substantially non-polar aromatic solvent.

18. The method of claim 14 further characterized in that the pigment is titanium dioxide.

19. The method of claim 1 further characterized in that the polycarboxylic acid cross-linking agent is selected from the group consisting of citric acid, aconitic acid, tartaric acid, citraconic acid, itaconic acid, maleic acid, fumaric acid, oxalic acid, and chlorendic acid.

20. The method of claim 19 further characterized in that the polycarboxylic acid is citric acid.

21. The method of claim 14 further characterized in that the polymeric material is prepared by copolymerizing an ethylenically unsaturated compound with a vinyl ester of a saturated monocarboxylic acid and a glycidyl ester of an acrylic acid.

22. The method of claim 14 further characterized in that the polymeric material is prepared by copolymerizing the ethylenically unsaturated compound with an ester of acrylic acid and a glycidyl ester of an acrylic acid.

23. The method of claim 14 further characterized in that the polymeric material is prepared by copolymerizing the vinylbenzene with at least one unsaturated ester and a glycidyl ester of an acrylic acid.

24. The method of claim 14 further characterized in that the polymeric material is prepared by copolymerizing at least one lower alkyl methacrylate with at least one unsaturated ester and a glycidyl compound of an acrylic acid.

25. The method of claim 24 further characterized in that at least one of the unsaturated esters is an ester of acrylic acid.

26. The method of claim 14 further characterized in that the polymeric material is obtained by copolymerizing a lower alkyl methacrylate, an ester of acrylic acid, and a glycidyl ester of an acrylic acid.

27. The method of claim 14 further characterized in that the coated substrate is baked at a temperature ranging from about 180–500° F. for a period ranging from about 5 seconds to 20 minutes.

28. The method of claim 14 further characterized in that the polycarboxylic acid cross-linking agent is citric acid and the polymeric material is obtained by copolymerizing vinylbenzene, 2-ethyl hexyl acrylate, and a glycidyl ester of acrylic acid.

29. The method of claim 14 further characterized in that the dispersion of the pigment and the polycarboxylic acid in the organic solution of the polymeric material is obtained by ball-milling the mixture until the particle sizes of the insoluble components are less than 12 microns.

References Cited

UNITED STATES PATENTS

| 2,676,166 | 4/1954 | Webers. | |
| 2,994,670 | 8/1961 | D'Alelio | 260—78.4 X |
| 3,052,659 | 9/1962 | Woodruff | 260—80.5 |
| 3,058,947 | 10/1962 | Fryling et al. | 260—78.4 |

ALFRED L. LEAVITT, *Primary Examiner.*

RALPH S. KENDALL, *Examiner.*